US008600861B2

(12) United States Patent
Rutt et al.

(10) Patent No.: US 8,600,861 B2
(45) Date of Patent: Dec. 3, 2013

(54) ON-SCREEN ROLLER CONTROLLED PRICE CHANGE

(75) Inventors: David A. Rutt, Tyrone, GA (US); Robert J. Sullivan, Rowell, GA (US); Edwin Marcial, Atlanta, GA (US)

(73) Assignee: IntercontinentalExchange, Inc., Atlanta, GA (US)

( * ) Notice: Subject to any disclaimer, the term of this patent is extended or adjusted under 35 U.S.C. 154(b) by 1202 days.

(21) Appl. No.: 11/923,776

(22) Filed: Oct. 25, 2007

(65) Prior Publication Data

US 2008/0052220 A1 Feb. 28, 2008

Related U.S. Application Data

(63) Continuation of application No. 11/418,967, filed on May 5, 2006, which is a continuation-in-part of application No. 11/123,614, filed on May 6, 2005.

(51) Int. Cl.
*G06Q 10/00* (2012.01)

(52) U.S. Cl.
USPC .............................................. 705/37; 705/26

(58) Field of Classification Search
USPC ...................................................... 705/37, 41
See application file for complete search history.

(56) References Cited

U.S. PATENT DOCUMENTS

| 6,198,473 | B1 | 3/2001 | Armstrong | |
|---|---|---|---|---|
| 2002/0161687 | A1 | 10/2002 | Serkin et al. | |
| 2002/0178104 | A1* | 11/2002 | Hausman | 705/37 |
| 2003/0135441 | A1 | 7/2003 | Ginsberg | |
| 2004/0215538 | A1 | 10/2004 | Smith et al. | |
| 2005/0256797 | A1* | 11/2005 | Tyulyaev | 705/37 |
| 2006/0085320 | A1* | 4/2006 | Owens et al. | 705/37 |
| 2009/0043664 | A1* | 2/2009 | Lutnick et al. | 705/26 |
| 2010/0030678 | A9* | 2/2010 | Stearns | 705/37 |

OTHER PUBLICATIONS

Access 2000, extracted from chapters 18 and 19, Anderson, B., 1999.*
Access 2000, extract from chapters 18 and 19, Andersen, V., 1999.*
Lais, "Zoomin' Ahead," Jun 26, 2000, Computerworld, vol. 34, Issue, 26, p. 92.*
Heim, "Point-Roll Debuts New Ad Unit on iWon.com," Jun. 25, 2001, Adweek, vol. 51, Issue 26, p. 7.*

\* cited by examiner

*Primary Examiner* — Samica L Norman
(74) *Attorney, Agent, or Firm* — DLA Piper LLP (US)

(57) ABSTRACT

A system and method of providing control of prices in an on screen window having a price held for further transactions on an interface for traders of financial instruments. The interface contains a display of products for trading and respective prices for bids and offers. The user has a control device such as a computer mouse with a roller control. Selection of a particular product results in the display of the price of the product at the instant time the product is selected. The price is held until a confirming key or mouse stroke is received to initiate a trading action such as placing a new order, killing an existing order or hitting or lifting an order. The price can be altered by means of the roller control.

46 Claims, 9 Drawing Sheets

| Product | Hub | Strip | + - | Sell | Qty | Bid | Offer | Qty | Buy | Last | Kill | Qty | Bid | Offer | Qty | Kill | Pin |
|---|---|---|---|---|---|---|---|---|---|---|---|---|---|---|---|---|---|
| NG Fin, FP for LD1 | Henry | Jun06 | | | | | 6.710 | 7500 | Lift | | | | | | | | |
| NG Fin, FP for LD1 | Henry | Jul06 | - | Hit Bid 2500 @ 6.495 | 2500 | 6.495 | 6.500 | 2500 | Lift | | | X | 2500 | 6.490 | 6.500 | 2500 | X | |
| | | | | Sweep | 2500 | 6.490 | 6.500 | 2500 | Sweep | | | X | 2500 | 6.490 | | | | |
| | | | | Sweep | 2500 | 6.490 | 6.500 | 2500 | Sweep | | | | | | | | |
| | | | | X | 2500 | 6.490 | 6.510 | 2500 | X | | | | | | | | |
| NG Fin, FP for LD1 | Henry | Aug06 | | Hit | 2500 | 6.520 | 6.536 | 2500 | Lift | | | | | | | | |

ICE Gas Oil Futures - ARA - May06,1 @ 548.50 (May 01, 2006 09:35:26 EDT)
ICE Gas Oil Futures - ARA - Jul06,1 @ 566.00 (May 01, 2006 09:34:29 EDT)
ICE UK Natural Gas Futures - NBP - Jun06, 5 @ 45.71 (May 01, 2006 08:51:49 EDT)
ICE UK Natural Gas Futures - NBP - Jun06, 5 @ 45.71 (May 01, 2006 08:51:47 EDT)
ICE UK Natural Gas Futures - NBP - Jun06, 5 @ 45.71 (May 01, 2006 08:51:46 EDT)

ON-SCREEN ROLLER CONTROLLED PRICE CHANGE

Related Applications

This application is a continuation of U.S. patent application Ser. No. 11/418,967 filed May 5, 2006 which is a continuation-in-part of U.S. patent application Ser. No. 11/123,614 filed May 6, 2005, the contents of which are hereby incorporated by reference.

FIELD OF INVENTION

This invention relates to a system and method of varying prices on screen in an electronic trading interface and more specifically to a system and method for changing prices using a roller device on a user computer control device.

BACKGROUND OF INVENTION

Traditional trading of commodities, natural resources or financial instruments such as stocks and bonds has taken place in markets where traders offer various commodities at different prices. Such trades were performed using hand signals and paper was used to finalize the actual trading contract. With the advent of computers, more complex and faster trades may be made by integrating computing power. Additionally, the growth of the Internet and other electronic communications systems has moved the realm of trading beyond the trading floor. Finally, different markets for non-traditional financial products such as energy have been established.

For example, one recent new trading exchange is the OTC energy market. Traders in the OTC energy market typically agree to prices and terms with another trading counter party for a particular type of derivative in an energy product such as a natural gas swap. This type of trade involves certain common terms such as settlement and payment terms. The trade may be made directly with a counter party, or by phone, or more recently, via an electronic platform such as the Internet. Such trades are recorded by the traders on their trade notebooks and trade data is entered directly into their company's trade data capture computer systems. These systems generate confirmation documents and summary data relating to the trade.

Recently, automated systems such as the WebICE software offered by Intercontinental Exchange of Atlanta, Ga. have become available for OTC energy traders via the Internet. Rather than using specialized software and hardware systems, trading is now available with a personal computer capable of running a ubiquitous web browser. The web based automated systems allow on screen display of bid and offer details for products such as commodities, natural resources, financial instruments and derivatives of the same, and instant transmission of instructions via a mouse click of bids and offers of such products. These systems utilize software and secure network systems which are tied to a central market computer.

Automated software such as WebICE allows a trader to send a fill or execute request on an order as displayed on the computer screen. A user will use a mouse and select a price to bid or offer by clicking on a mouse button or using the keyboard. A user will then move the mouse to a quantity field and select the quantity with a mouse or keyboard. Finally, the user will initiate the order via a mouse or keyboard button to initiate the trading with the other parties through the market exchange server. New orders are queued via an onscreen stack. However, with the speed of electronic transmission, market data which establishes prices and quantities outpaces the ability of humans to process the information and act upon it. Thus, the multiple moves of the mouse in combination with keystrokes may result in delays which result in distortions of the actual price. More advanced software has integrated multiple steps or keystrokes into one action which speeds the transaction.

For example in WebICE, if a trader wishes to send a fill request on a displayed quantity and price, a single keyboard or mouse interaction will allow a trader to initiate the fill request. A problem arises if the underlying quantity or price changes in the displayed screen. Because of hand/eye lag behind the computer screen, the trader may end up sending a fill request to the exchange with an unintended quantity or price which changed while the trader activated the fill request on the software.

A similar problem arises in the case of establishing a new order in a stack along with all other active orders in a contract. This feature is important in order to help a trader manage orders. If a trader wishes to send a new order request, a single keyboard or mouse interaction will allow a trader to initiate the new order request. However, if the underlying quantity or price changes in the displayed stack, because of hand/eye lag behind the computer screen, the trader may end up sending an order to the exchange with an unintended quantity or price.

A further problem arises in a situation where a trader desires to kill an order. Such an order will be in a stack displayed on screen which shows a trader's own orders in the stack along with all other active orders in a contract. If a trader wishes to cancel/kill an order, a single keyboard or mouse interaction will allow a trader to initiate the kill request. However, if the underlying order moves in the displayed stack, because of hand/eye lag behind the computer screen, the trader may end up acting upon the wrong order.

Thus, there is a need for an on screen mechanism to lock a price for electronic trade actions over a computer screen. There is a further need for a price lock pop up window to lock a price in the case of an initial selection for placing a new order. There is also a need for a price lock mechanism to lock a price selected to hit a specific order. There is also a need to provide an on screen locking mechanism to preserve the quantity desired for trading transactions. There is an additional need for a mechanism for a user to make adjustments to a price on screen in a convenient and easy manner.

Thus, there is also a need for an on screen mechanism to enter a price for electronic trade actions over a computer screen with a single click. There is a further need for a single click over window to view a price in the case of an initial selection for placing a new order. There is also a need for a single click mechanism to enter a price selected to enter a specific order.

SUMMARY OF THE INVENTION

These needs and others may be met by the present invention, which has an aspect that is a system for controlling a price in an electronic trading system for products, the trading system including an exchange server coupled to trading computers. The exchange server sends current prices of products for bid or offer by users of the trading computer and the exchange server updates the current prices based on bids or offers. The system further included a computer program having a user interface screen displayed on the trading computers and a user input device having a roller control. The user input device controls a cursor which appears on the user interface screen. The system further includes a series of product orders; a series of cells of prices offered for the product orders; a series of cells of prices bid for the product orders; and a price lock window which appears when the cursor is moved over any cell in the series of cells of prices offered for the products or the series of prices bid for the products. In addition, the price lock window displays the price in the cell at the moment the cursor enters the cell and the roller control allows a user to change the price in the price lock window.

In another embodiment, the system further includes a series of product orders; a series of cells of prices offered for the product orders; a series of cells of prices bid for the product orders; and a single click order entry window which appears when the cursor is moved over any cell in the series of cells of prices offered for the products or the series of prices bid for the products. In addition, the single click window displays the price in the cell at the moment the cursor enters the cell and the roller control allows a user to change the price in the single click order entry window.

It is to be understood that both the foregoing general description and the following detailed description are not limiting but are intended to provide further explanation of the invention claimed. The accompanying drawings, which are incorporated in and constitute part of this specification, are included to illustrate and provide a further understanding of the method and system of the invention. Together with the description, the drawings serve to explain the principles of the invention.

BRIEF DESCRIPTION OF DRAWINGS

These and further aspects and advantages of the invention will be discussed more in detail hereinafter with reference to the disclosure of preferred embodiments, and in particular with reference to the appended Figures wherein.

DESCRIPTION OF THE PREFERRED EMBODIMENT

While the present invention is capable of embodiment in various forms, there is shown in the drawings and will hereinafter be described a presently preferred embodiment with the understanding that the present disclosure is to be considered as an exemplification of the invention, and is not intended to limit the invention to the specific embodiment illustrated.

Figure 1:
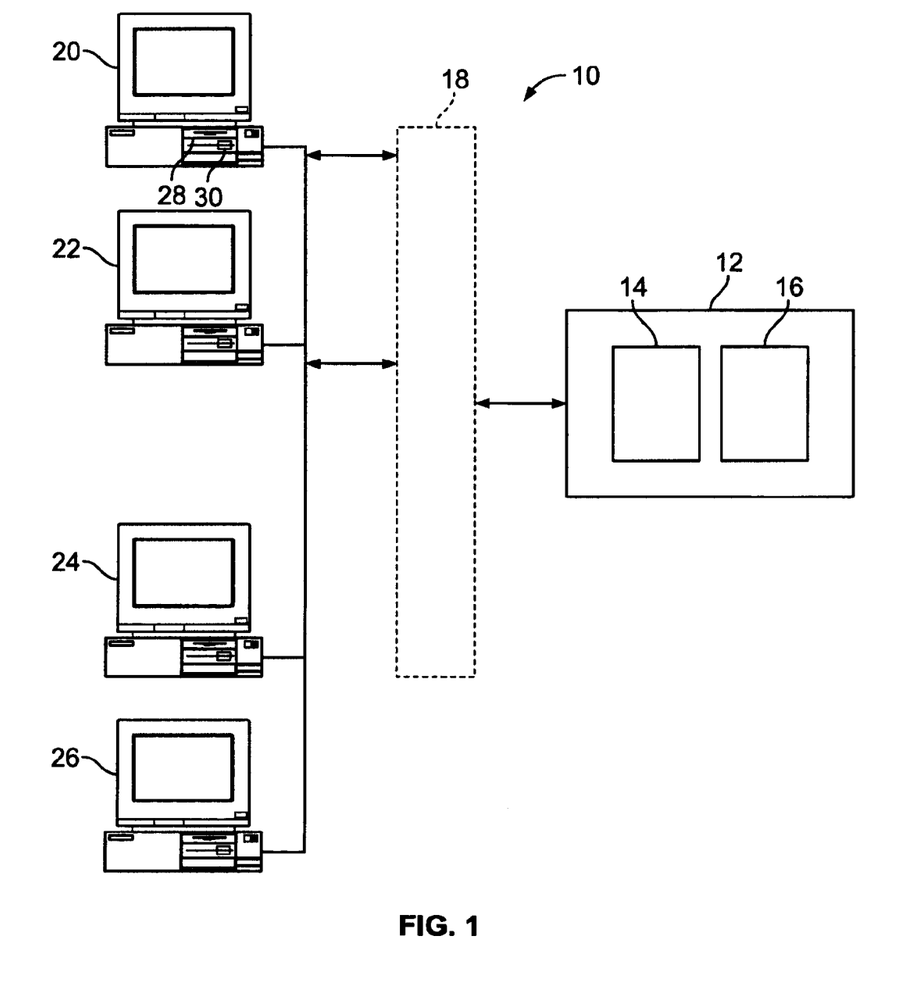
FIG. 1 is a block diagram of a computer system for electronic trades of financial products.

FIG. 1 shows a block diagram of an electronic trading system 10 which is an example of a platform which uses the price lock popup system of the present invention. The electronic trading system 10 has an exchange server 12 which is provided by a trading exchange such as the Intercontinental Exchange. The trading exchange in this example offers trading in energy related contracts and derivatives but it is to be understood that any type of electronic trading exchange which allows trading of any contract for any product with a degree of fungibility including commodities, natural resources, and financial products of any nature (equities, debt, index products, etc), together with financial derivatives of the foregoing may use the principles discussed herein. The exchange server 12 runs a matching engine software program 14 which provides trading functions for receiving orders, price changes, order cancellations, executing trades and sending data relating to available products such as the market type, the quantity and price of bids and offers, and notification of trades executed in the products (in this example energy related contracts and derivatives) traded over the exchange. The trades are recorded by the matching engine software 14 and stored in a database 16.

The exchange server 12 is coupled via a network such as the Internet 18 with trading computers such as computers 20, 22, 24 and 26. As will be explained, each of the computers 20, 22, 24 and 26 have a display and interface software 28 for the submission of offers and bids in markets offered by the exchange server 12. The interface software 28 also receives and displays market data relating to various markets of interest to a trader or broker from the exchange server 12. The interface software 28 thus serves as a data interface having market data belonging to the exchange entity which runs the exchange server 12. The market data is updated by the exchange server 12 to provide current data to the computers 20-26. The market data is stored in a market database (not shown) which is part of the exchange server 12. Of course, it is to be understood that computers 20-26 are merely shown as examples and there can be numerous computers which submit trade data to the exchange server 12. It is also to be understood there may be multiple servers and other computers which overall perform the functions of the matching engine software 14, but for simplicity only one server is represented in this example.

In this example, traders and brokers interface with the exchange server 12 interfaces via computers such as the computer 20 with an Internet browser program 30 having the capability of running Java, HTML and JavaScript. The user is thus presented with a web interface displayed on the user computer 20 to perform the various trading functions according to the interface software 28 or API which is preferably implemented as a Java applet used in conjunction with the web browser program. Of course, it is to be understood that any of the other trading computers 22, 24 and 26 may also be capable of running the user interface via a web browser program.

Figure 2:
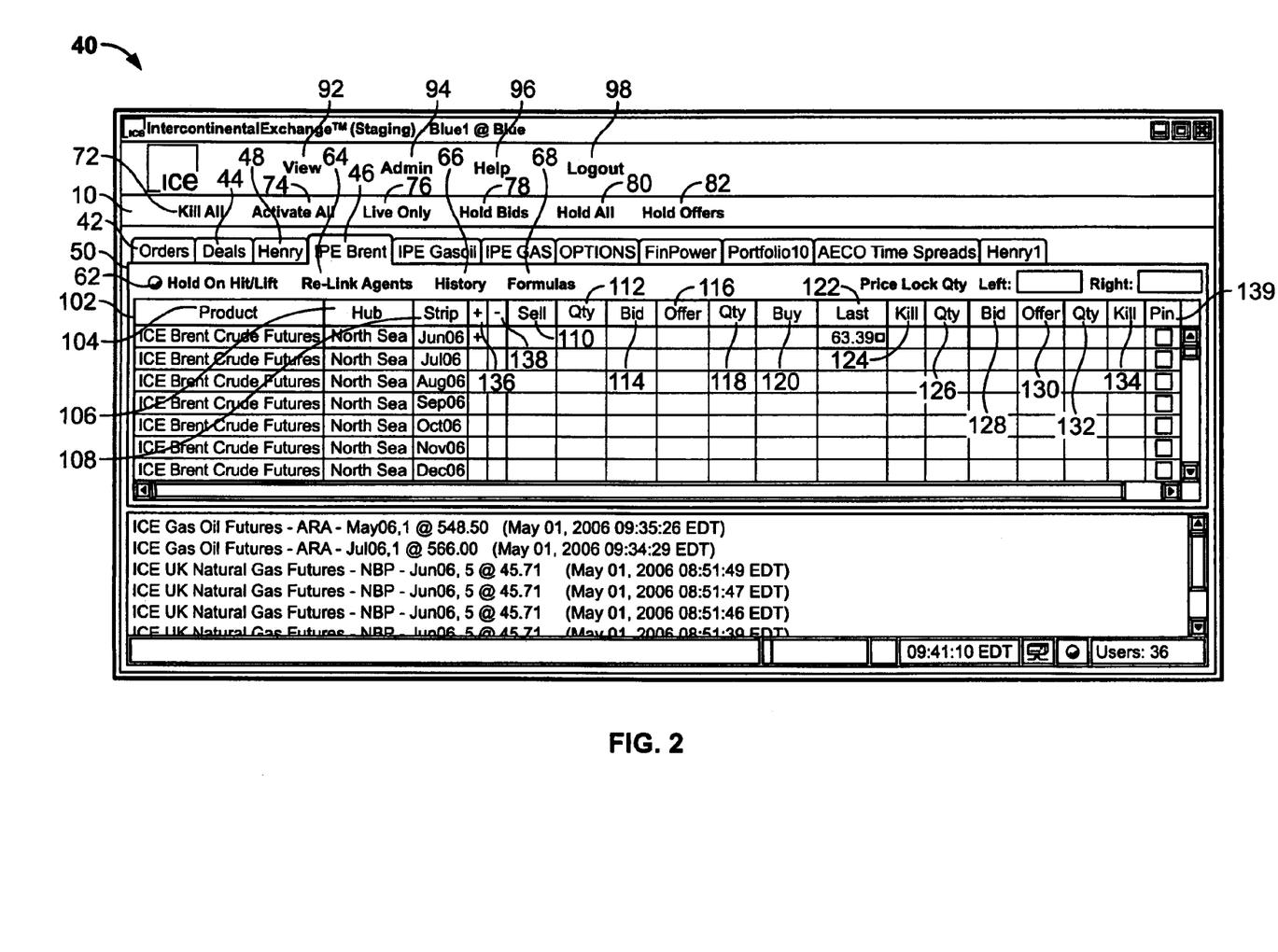
FIG. 2 is a screen shot of the user interface of the trading system.

FIG. 2 is a screen print of a user interface 40 which is generated by the interface program 28 on the computer 20 to allow electronic trading by communication with the exchange server 12. The computer 20 has a user input device such as a keyboard and a mouse which has a right button, a left button and a roller between the buttons. The user input device allows the user to traverse to different areas of the user interface 40 via an on screen cursor and activate different functions using the buttons and the roller. The user interface 40 has an orders tab 42 which when selected displays a screen showing order data which the user has access to. The user interface 40 has a deal tab 44 which displays a screen showing all trades which the user has access to. A number of user defined portfolio tabs 46 are displayed in alignment with the orders tab 42 and the deal tab 44. Each of the user defined portfolio tabs 46 when selected displays a window with information relating to markets which are bundled in the portfolio. In the example in FIG. 2, a tab 48 representing a specific market portfolio relating to a specific energy commodity (IPE Brent) has been selected. A markets window 50 displays different energy related contracts or derivatives being offered and bid on in rows and has columns which include price, quantity and other data obtained through the exchange server 12. A trade ticker window 52 is displayed below the market window 50 to show a continuous stream of quotes for different markets.

The user interface 40 allows a trader to perform various functions relating to markets traded in the exchange. The interface 40 allows a trader to view markets, bid and offer in markets for products, and manage orders. The interface 40 also allows a trader to create and modify portfolios of markets and produce different reports.

The markets window 50 includes a menu bar 60 which includes a hold on hit/lift selection 62, a re-link agents selection 64, a history selection 66 and a formulas selection 68. The hold on hit or lift selection 62 allows a trader to remove or lift all the orders from a portfolio when one of the orders in the portfolio is executed at the hit price. The re-link agents selection 64 allows a trader to reestablish communications links to the data sources available to the user. The history selection 66 allows a trader to display via the formula selection only. The formulas selection 68 allows a trader to access the formulas model to apply formulas generated on their own computer 20 to data from the exchange server 12 displayed by the user interface 50.

A function bar 70 has a kill all selection 72, an activate all selection 74, a live only selection 76, a hold bids selection 78, a hold all selection 80 and a hold offers selection 82. The kill all selection 72 allows a user to kill all orders. The activate all selection 74 allows a user to activate all orders which are being held at the exchange or at local Cache. The live only selection 76 allows a user to display all products in the market window 50 which have actual prices and hide the products which do not. The hold bids selection 78 allows a user to hold the bids for all products displayed in the market window 50. The hold all selection 80 allows a user to hold all bids and offers. The hold offers selection 82 allows a user to hold all offers.

The user interface 40 also has a number of global actions including a view selection 92, an admin selection 94, a help selection 96 and a logout selection 98. The view selection 92 displays a menu having the options of displaying other screens available. The admin selection 94 allows a user to control the user settings, control portfolios displayed and reset the markets which are available for trading. The help selection 96 provides help instruction screens and the logout selection 98 allows a user to log off the program.

The markets window 50 has a series of cells organized in a number of rows 100 which display products which are available from the selected market portfolio. The markets window 50 also has a series of cells organized in informational columns 102 which contain information for each product. The informational columns 102 include a product name column 104, a hub column 106, a strip column 108, a sell action column 110, a bid quantity column 112, a bid price column 114, an offer price column 116, a bid quantity column 118, a buy action column 120, a last column 122, a kill bid column 124, a working bid quantity column 126, a working bid price column 128, a working offer price column 130, a working offer quantity column 132 and a kill offer column 134.

The product name column 104 describes the name of the product which in this example are energy products. FIG. 2 shows a selection of a product line 140 which is Brent Crude Oil. The hub column 106 describes the physical location of the product which is the North Sea in this example. The strip column 108 is the time of the delivery of the product which is June 2006 in this example. The columns 104, 106 and 108 describe the contract being traded.

An expand option 136 and a shrink option 138 are provided in the informational column 102. The expand option 136 allows a user to view all of the current bids and offers for the selected product row. The shrink option 138 hides the current bids and offers except for the current best bid or offer.

Figure 3:
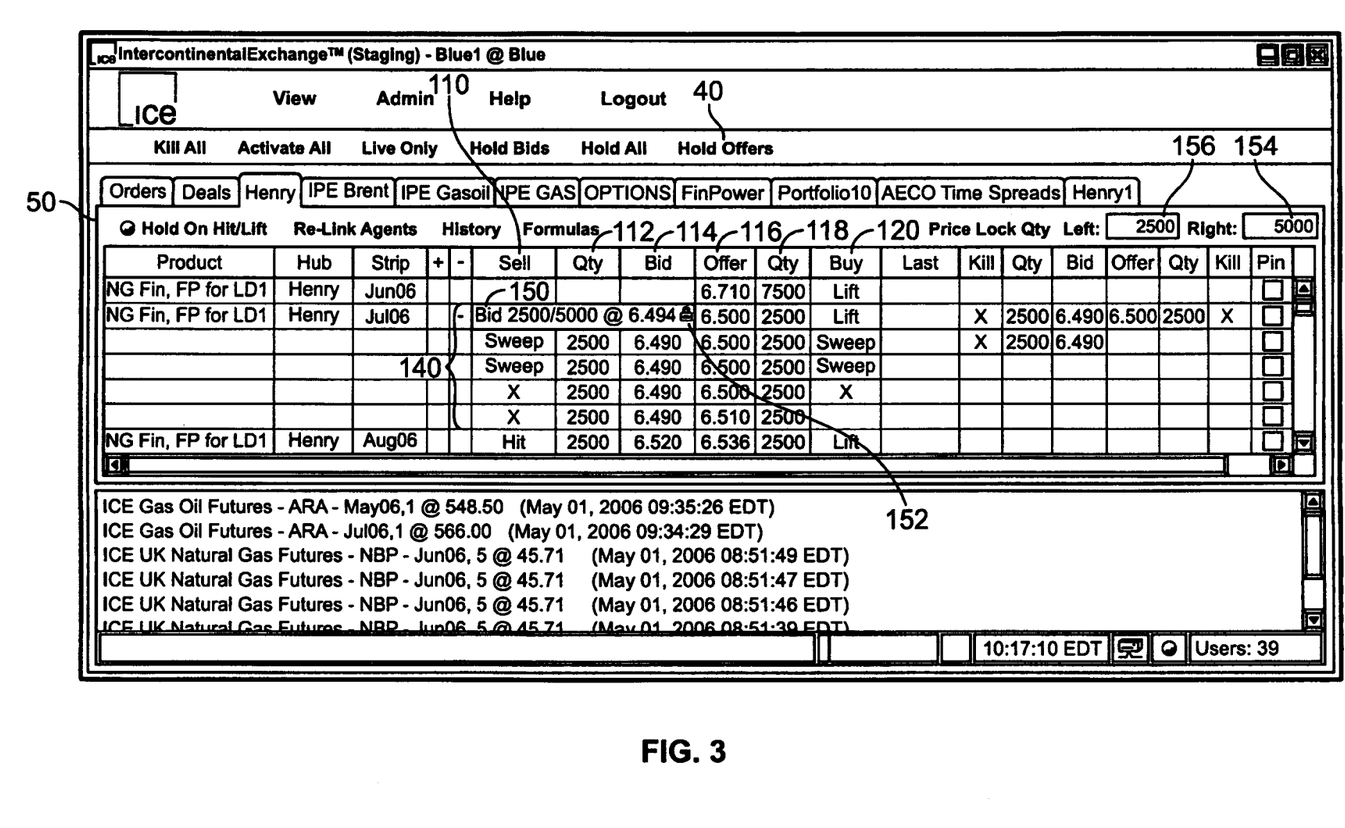
FIG. 3 is a screen shot of the user interface of the trading system with the use of a price lock single click order entry to enter a new order.

FIG. 3 shows the user interface 40 of FIG. 2 with the single click order entry feature. The sell column 110 indicates the action that is available for the particular product for the user. The sell column 110 for the example row 140 has been expanded to show the action entries for each price offered. These action entries include hit, sweep or X. The hit selection is assigned by the software to determine whether the order may be hit, causing a trade to occur. The sweep indication indicates that the user will take all orders at the specified price in the bid price column 114 and may be enabled by the user. The X indicates that the order which is owned or controlled by the user will be killed if selected.

The sell quantity column 112 shows the quantity of product units available for the sell column 110 and the bid column 114. Together these columns 110, 112 and 114 describe the bid or buy side. The bid column 114 shows the price that a market participant is bidding for the product. As shown in the product row 140, different bids at prices ranging from 6.494 to 6.490 have been made for the quantity of 2500. The software arranges the bids from best price to worst price.

The offer column 116 shows the offers to sell at the prices shown. The quantity column 118 shows the quantity being offered. The buy column 120 shows the action entries available for the user. Together, the columns 116, 118 and 120 describe the offer or sell side. The buy column 120 for the example row 140 has been expanded to show the action entries for each price offered. These action entries include lift, sweep or X. The lift selection is assigned by the software to determine whether the order may be lifted or bought. The sweep tag indicates that the user will take all orders at a higher price and may be enabled by the user. The X indicates that the order which is controlled by the user will be killed if the option is selected using the mouse or keyboard.

Returning to FIG. 2, the last column 122 shows the last traded price for the product. The columns 124-132 are a working order area to show a trader's order. The kill column 124 signifies that a user can kill the order by clicking on the displayed X in the kill column 124 via the mouse. The quantity column 126 shows the working quantity of the bid order and the bid column 128 shows the price of the working bid. The offer column 130 shows the price of the working offer and the offer quantity column 132 shows the working quantity of the offer order. The offer kill column 134 shows an X which the trader can use to kill his own order. A pin column 139 indicates if the product should be displayed when using the live only feature 76 even if the product has no active bids or offers or a last traded price.

The market window 50 and the user interface 40 may be used by a trader to initiate a new order, kill or cancel an order or hit or lift an order. Initiating a new order requires a user to place the mouse pointer over the bid column 114 or the offer column 116 in the row of the product in the market. Initiating a kill order requires a user to place the mouse pointer over sell column 110 or the buy column 120 in the appropriate row of the product where an X is displayed. Hitting or lifting an order requires a user to place the mouse pointer over the sell column 110 or the buy column 120 in the appropriate row of the product and select the hit or lift tab that appears on the screen (not shown).

FIG. 3 shows the use of a single click order entry window 150 in initiating a new order using the user interface screen 40 shown in FIG. 2. The single click order entry window 150 is displayed when the cursor enters a cell of the market window 50 containing an existing price in the bid column 114 signifying an offer. The lock window 150 will display a quantity and price which is shown in the bid column 114 at the moment the cursor enters any of the cells for the product such as the product in row 140. The lock window 150 also has a lock icon 152 which signifies that the price lock is in effect. The quantity and price will be held in memory and a user will activate the request for a new order at the quantity and price by clicking on a mouse button. The lock window 150 remains on the user interface screen 40 and thus holds the quantity and price unless the cursor is moved from the cell. The new order will be initiated at the current price and quantity matching the price and quantity displayed in the lock window 150 when the user activates the request for the new order.

A right price lock quantity window 154 and a left price lock quantity window 156 are also displayed above the market window 50 which show two different default quantities. Thus pressing the left button on the mouse will activate the request at the predetermined quantity displayed in the left price lock quantity window 154 and pressing the right button will activate the request at the predetermined quantity displayed in right price lock quantity window 156. Of course other keys on the keyboard may activate the request at the quantity and price stated in the price lock window 150.

Figure 4:
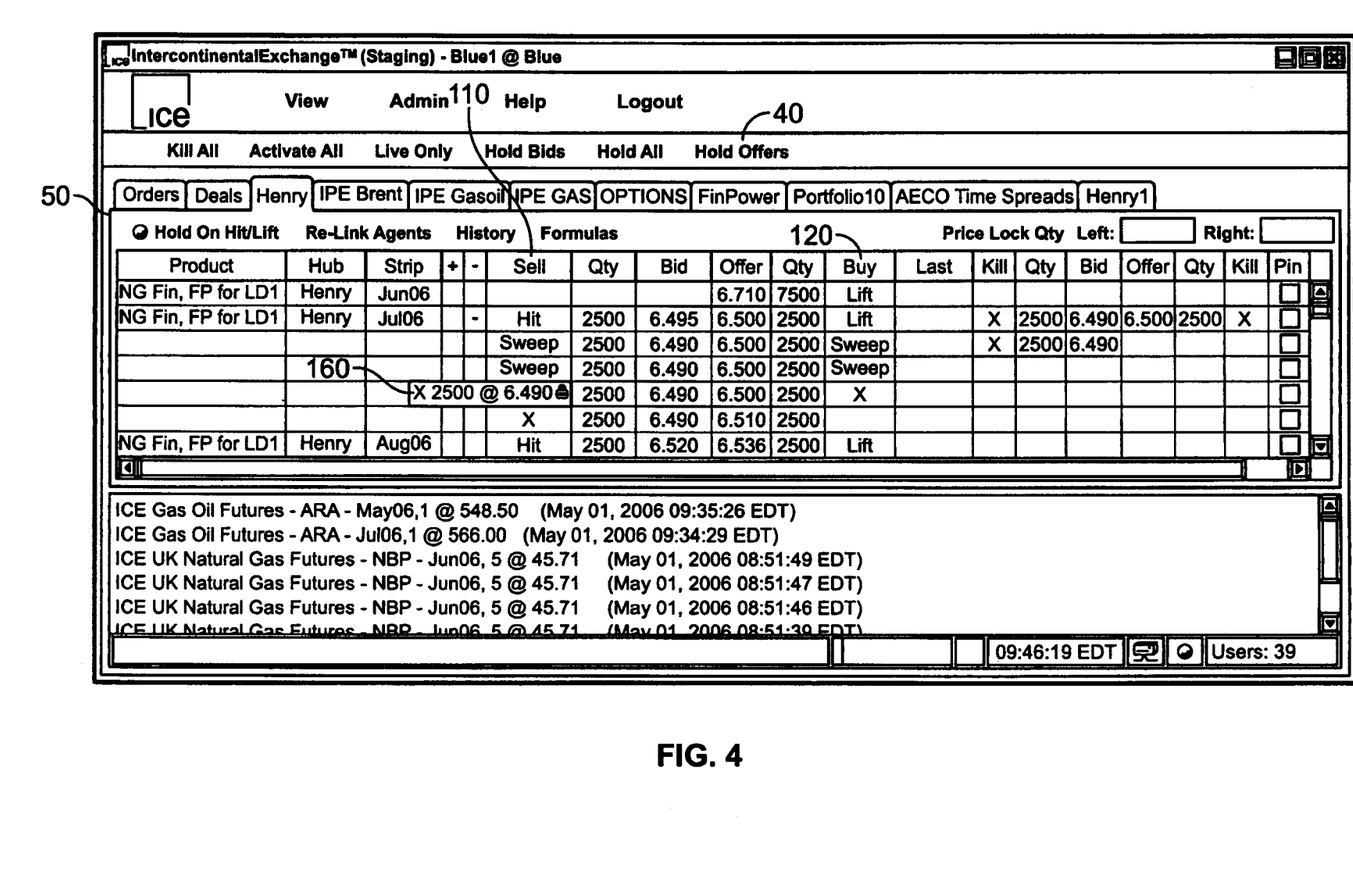
FIG. 4 is a screen shot of the user interface of the trading system with the use of a price lock on a kill order.

FIG. 4 shows the use of a price lock window 160 in initiating a kill order using the user interface screen 40 shown in FIG. 2. The floating lock window 160 is displayed when the cursor enters the cell of the market window 50 containing an X in the sell column 110 or the buy column 120 signifying that the order belongs to the user. The lock window 160 will contain a quantity and price which is present at the moment the cursor enters the cell. The quantity and price will be held in memory and a user will kill the order at the quantity and price by clicking on a mouse button. The lock window 160 remains on the user interface screen 40 and thus holds the quantity and price unless the cursor is moved from the cell. The kill order will only be initiated if the current price and quantity match the price and quantity displayed in the lock window 160 when the user activates the kill order. Of course it is to be understood that other keys such as those on the keyboard may activate the kill.

Figure 5:
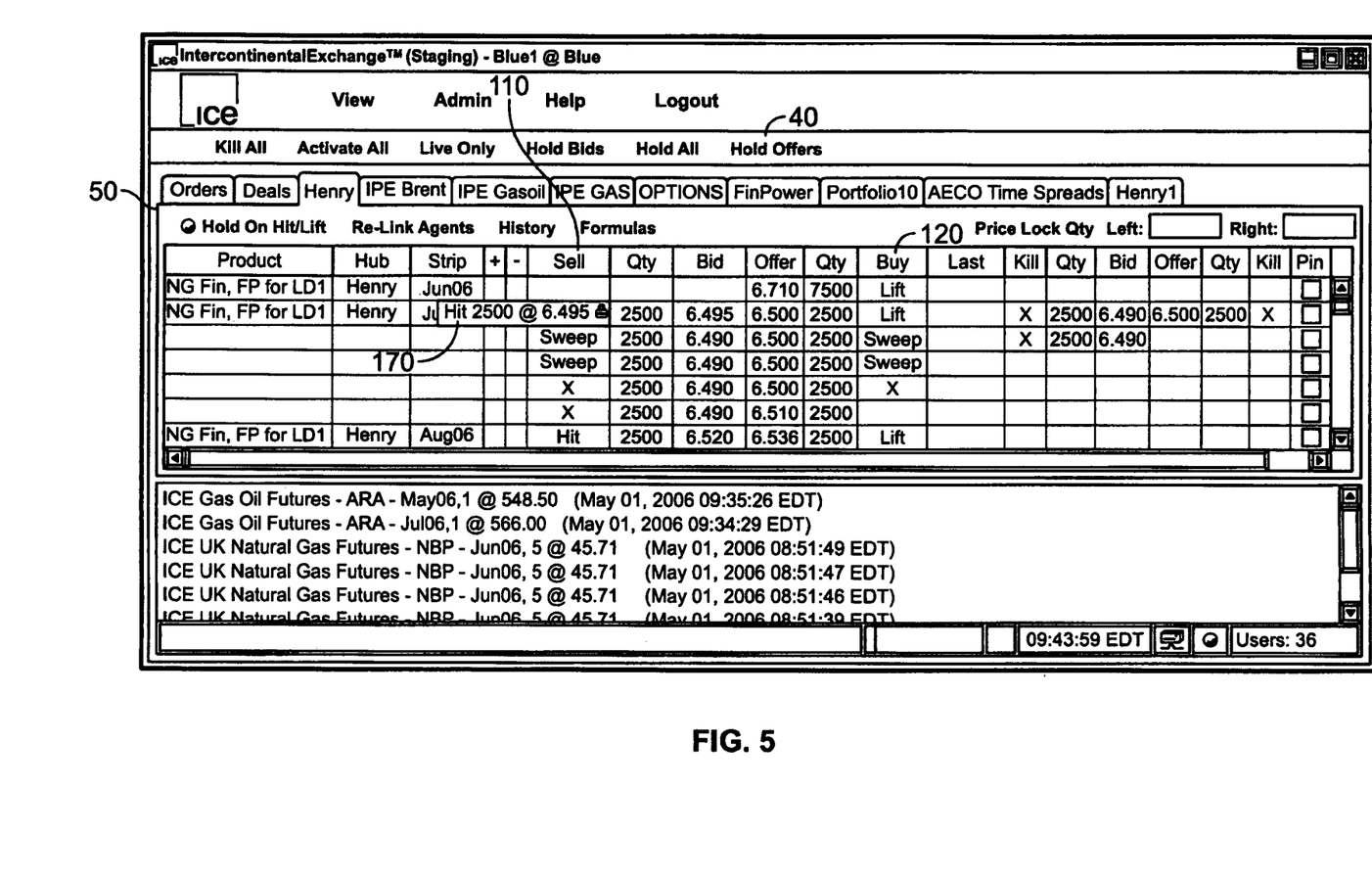
FIG. 5 is a screen shot of the user interface of the trading system with the use of a price lock on a hit or lift price.

FIG. 5 shows the use of a price lock window 170 in hitting or lifting an order using the user interface screen 40 shown in FIG. 3. The floating lock window 170 is displayed when the cursor enters the cell of the market window 50 containing a hit tag in the sell column 110 or a lift tag in the buy column 120. The lock window 170 will contain a quantity and price which is present at the moment the cursor enters the cell. The quantity and price will be held in memory and a user will activate the request to hit at the quantity and price by clicking on a mouse button. The lock window 170 remains on the user interface screen 40 and thus holds the quantity and price unless the cursor is moved from the cell. The hit or lift order will only be initiated if the current price and quantity match the price and quantity displayed in the lock window 170 when the user activates the hit or lift order. Of course it is to be understood that other keys such as those on the keyboard may activate the request.

Figure 6:
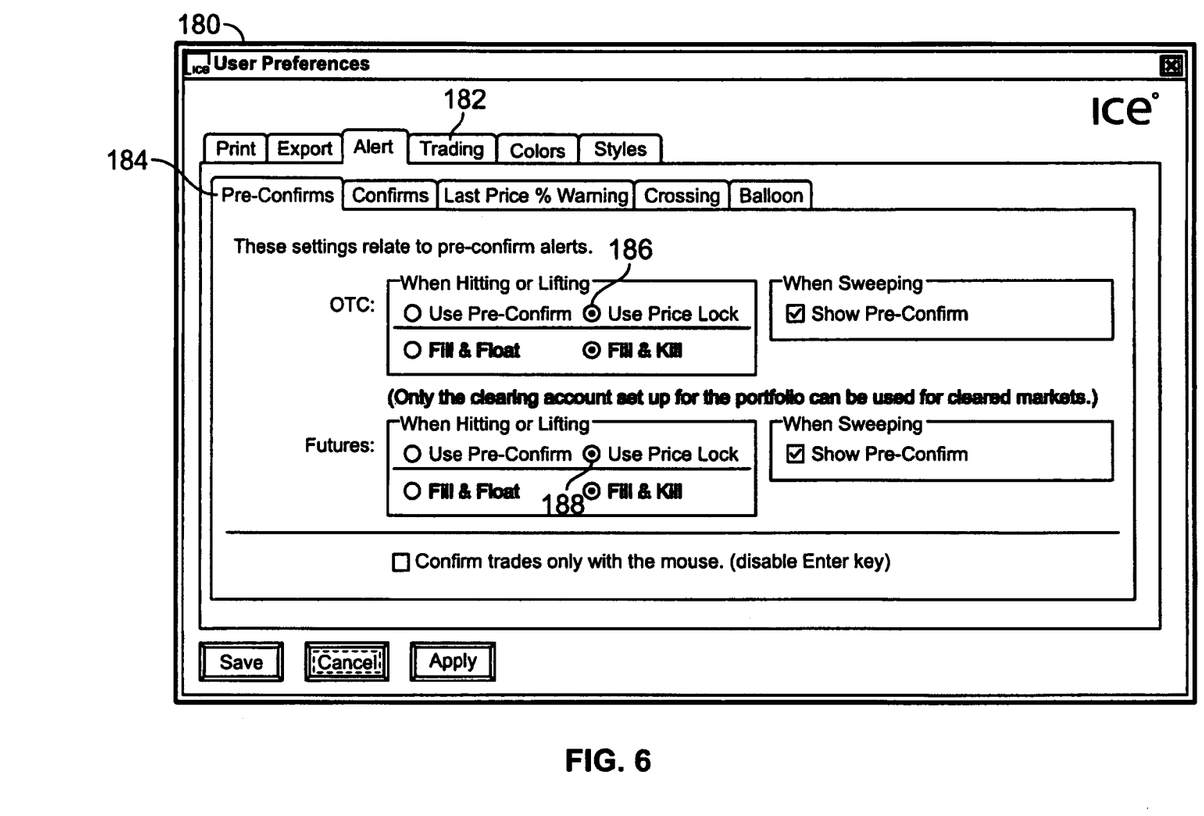
FIG. 6 is a screen shot of a selection screen used to activate the price lock feature.

The settings for the price lock windows displayed in FIGS. 3-5 are established in a options screen 180 as shown in FIG. 6. The options screen 180 is accessed via the admin selection 94 in the user interface 40 in FIG. 2. The options screen 180 has a number of settings tabs 182 including a pre-confirms tab 184. Selecting the pre-confirms tab 184 allows the use of the price lock windows in FIGS. 3-5 via an OTC price lock selection 186 and a futures price lock selection 188.

Figure 7A:
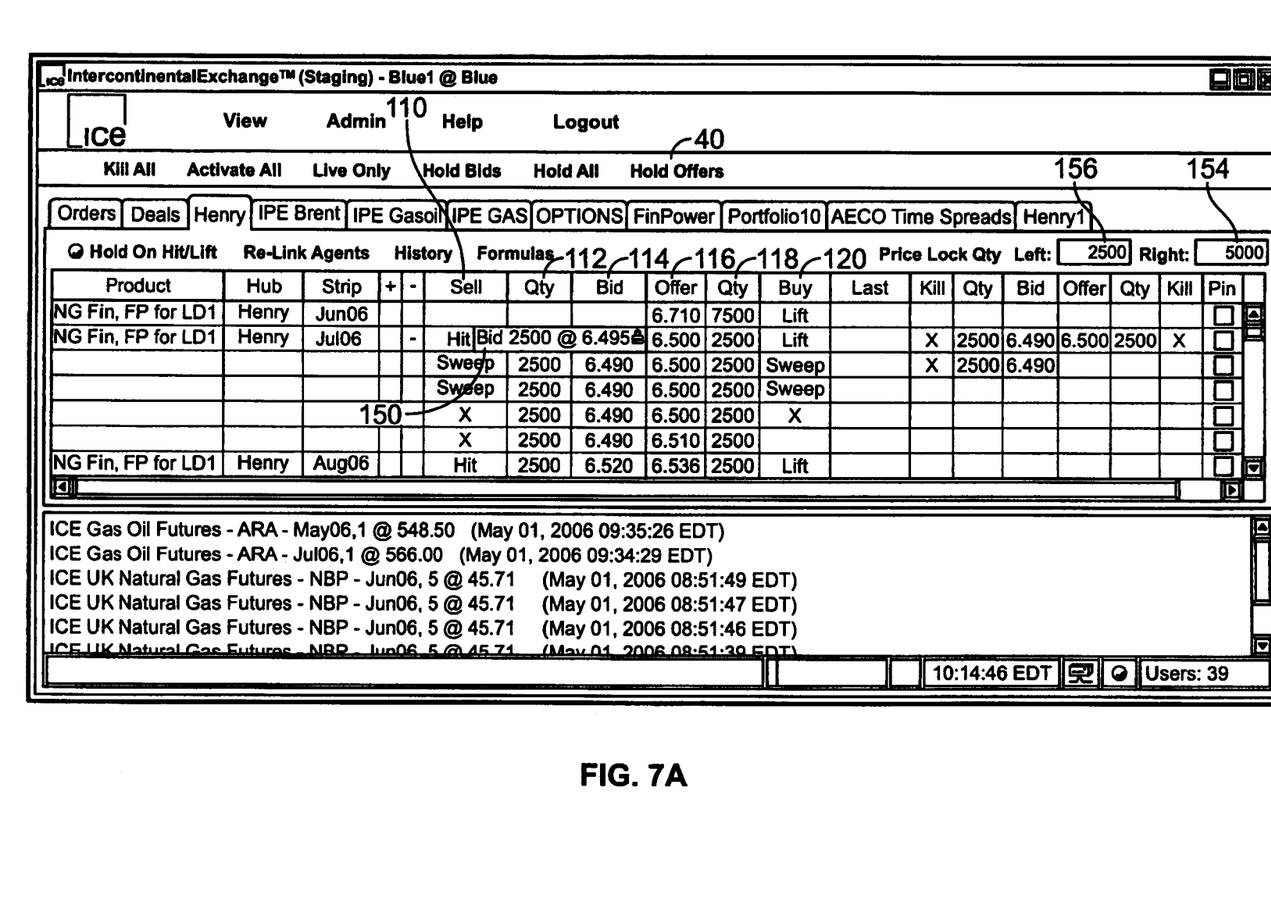
FIG. 7A-7C are screen shots of the user interface showing the use of a roller on a mouse to change the price in the single click window.
Figure 7B:
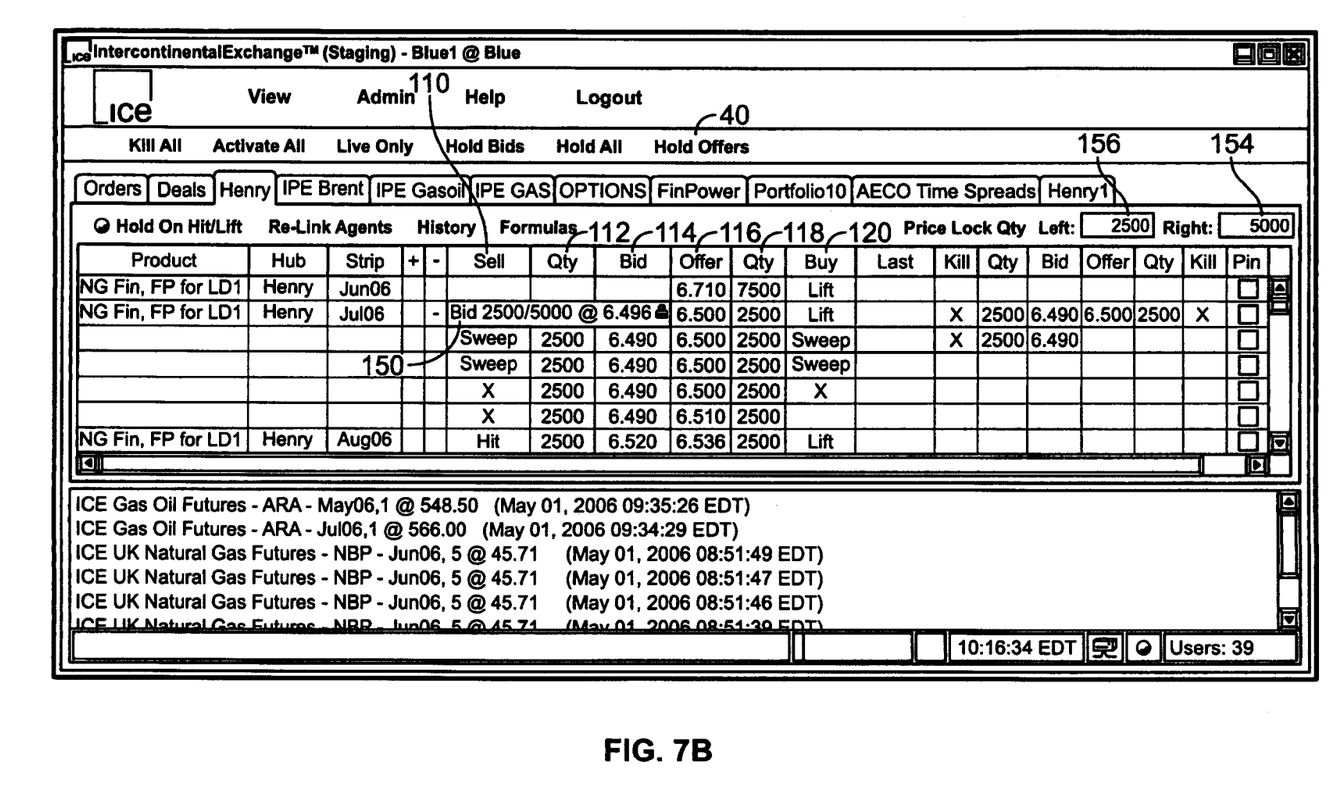
Figure 7C:
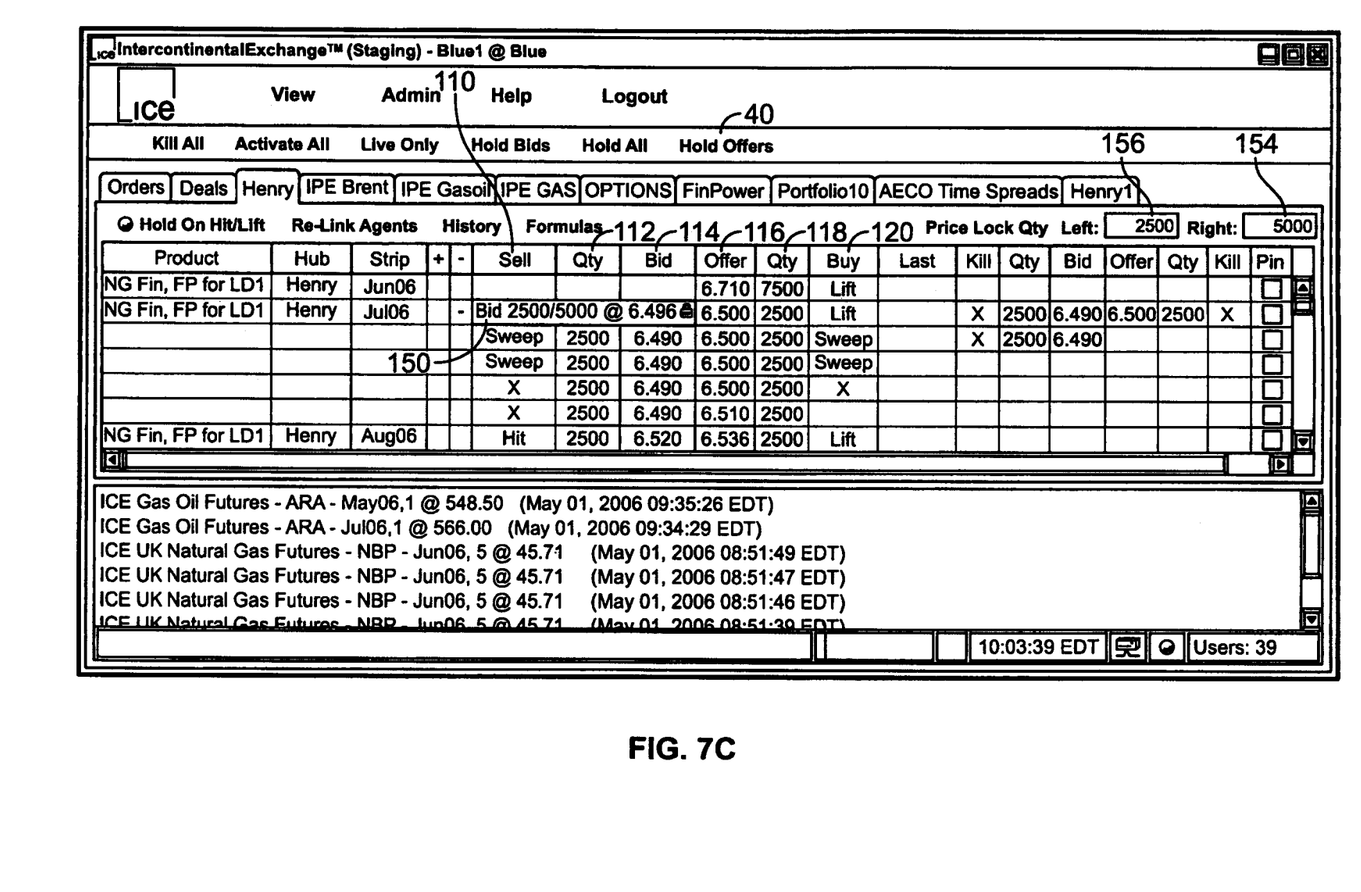

FIGS. 7A-7C are screen shots of another feature of the single click order entry window as explained in FIG. 3. The standard features of the trading program are identical between FIGS. 3 and 5 and like elements are assigned like numbers. It is to be understood that the price lock window may be used in any variety of functions as explained in FIGS. 3-5 above. FIG. 7A shows a modified single click window 150 which is displayed whenever the cursor is moved over a bid in the column 114. The single click window displays the price and quantity as shown in FIG. 7A. The quantity displayed is that which is preset in the quantity fields 154 and 156. As in the previous screens, by clicking the right button on the mouse, the right quantity in field 154 is bid to buy, and by clicking the left button on the computer mouse, the left quantity in field 156 will be bid to buy. The roller which is typically between the left and right buttons on a mouse may also be used to adjust the price. When a user rotates the roller in one direction, the price displayed in the single click window will increase in set increments. For example, as shown in FIG. 7B, the price in the single click window 150 has increased by 0.001 due to rotating the roller forward. Rotating the roller in the opposite direction will result in the price displayed in the price lock window decreasing in set increments as shown in FIG. 7C which shows the price in the price lock window 150 has decreased by 0.001. The new price will be the one bid at the set quantity depending on pressing the left or right mouse button. The price increments depend on the market type which is selected. The roller control may control the price in the single click order entry window and in any of the uses which are described above.

It will be apparent to those skilled in the art that various modifications and variations can be made in the method and system of the present invention without departing from the spirit or scope of the invention. Thus, the present invention is not limited by the foregoing descriptions but is intended to cover all modifications and variations that come within the scope of the spirit of the invention and the claims that follow.

What is claimed is:

1. A system for adjusting trade details and initiating trading functions in an electronic trading environment comprising:
   at least one exchange server for providing trading functions to one or more trading terminals; and
   at least one trading terminal comprising a user interface in communication with the exchange server, the user interface comprising an on-screen adjustment mechanism configured to adjust one or more trade details prior to executing a trading function, wherein the adjustment mechanism automatically appears when an on-screen cursor is moved over any of said trade details.

2. The system of claim 1, wherein the trading functions comprise one or more selected from the group consisting of initiating new orders, initiating kill orders, hitting existing orders, and lifting existing orders.

3. The system of claim 2, wherein the exchange server is further configured to provide ancillary functions comprising at least one of receiving product orders, providing current trade detail information relating to the product orders, changing product trade details, providing, real-time market data for one or more markets, and providing trade execution confirmation information.

4. The system of claim 1, wherein the at least one exchange server comprises a matching engine software program that when run enables the at least one exchange to provide the trading and ancillary functions.

5. The system of claim 4, wherein the at least one exchange server further comprises a database for storing recorded trade transactions.

6. The system of claim 1, wherein the at least one trading terminal comprises a display for displaying the user interface to a user.

7. The system of claim 6, wherein the at least one trading terminal further comprises a interface software program that when run generates the user interface and enables a user to adjust trade details and initiate trading and ancillary functions.

8. The system of claim 7, wherein the one or more trade details comprises at least one of a price and a quantity of at least one product available for trade.

9. The system of claim 8, wherein the at least one trading terminal further comprises a user input device which is operable for manipulating an on-screen cursor, adjusting trade details, and initiating trading and ancillary functions.

10. The system of claim 9, wherein the on-screen adjustment mechanism is a transaction window which displays trade details at their current values the instant the on-screen cursor is positioned over said trade details via the input device.

11. The system of claim 10, wherein the transaction window is configured to display adjusted trade detail values adjusted in response to the user's manipulation of the input device.

12. The system of claim 11, wherein the input device comprises a roller mechanism, the roller mechanism being operable to adjust the trade detail values according to the user's manipulation of said roller mechanism.

13. The system of claim 12, wherein the transaction window is further configured to initiate at least one of the trading functions in response to a single input signal provided via the input device.

14. The system of claim 13, wherein the at least one product available for trade comprises one or more selected from the group consisting of commodities, natural resources, financial instruments, and derivative products.

15. The system of claim 14, wherein the user interface compries one or more display tabs for displaying pre-selected electronic trading data, said display tabs comprising one or more of an order tab for displaying order data to which the user has access, a deal tab for displaying trade data to which the user has access, and a portfolio tab for displaying information relating to one or more trading markets which are bundled together in one or more portfolios.

16. The system of claim 15, wherein the user interface further comprises a markets window for displaying one or more commodities contracts, together with one or more trade details associated with the one or more commodities contracts.

17. The system of claim 16, wherein the user interface further comprises a trade ticker window for displaying a continuous stream of quotes associated with one or more commodities markets, the stream of quotes being provided by the one or more exchange servers.

18. The trading terminal of claim 12, wherein rolling the roller mechanism in one direction causes trade detail values to increase and rolling the roller mechanism in an opposite direction causes the trade detail values to decrease.

19. The system of claim 1, wherein the user interface is operable for use by at least one of an individual trader, a trading company, and a broker.

20. A method for adjusting trade details and initiating trading functions in an electronic trading environment comprising:

providing at least one exchange server for providing trading functions to one or more trading terminals; and providing at least one trading terminal comprising a user interface in communication with the exchange server, the user interface comprising an on-screen adjustment mechanism configured to adjust one or more trade details, wherein the adjustment mechanism automatically appears when an on-screen cursor is moved over any of the trade details;

displaying to a user via the at least one trading terminal one or more trade details relating to one or more products; and the user adjusting one or more of the trade details according to a user initiated interaction with the user interface prior to executing a trading function.

21. The method of claim 20, wherein the trading functions comprise one or more selected from the group consisting of initiating new orders, initiating kill orders, hitting existing orders, and lifting existing orders.

22. The method of claim 21, further comprising providing an exchange server configured to provide ancillary functions, the ancillary functions comprising one or more functions selected from the group consisting of receiving product orders, providing current trade detail information relating to the product orders, changing product trade details, providing real-time market data for one or more markets, and providing trade execution confirmation information.

23. The method of claim 22, further comprising updating and providing updated market data to the user via the user interface.

24. The method of claim 23, further comprising displaying the one or more trade details at their current values in a transaction window, wherein the transaction window is the on-screen Adjustment mechanism.

25. The method of claim 24, further comprising manipulating the user input device once the transaction window is displayed in order to adjust the one or more trade details to desired values.

26. The method of claim 25, wherein the user input device comprises a roller mechanism, the method further comprising adjusting the one or more trade details by rolling the roller mechanism.

27. The method of claim 26, further comprising initiating at least one of the trading functions, upon adjusting one or more trade details, via a single click.

28. The method of claim 27, further comprising executing the initiated trading function if the adjusted values of the one or more trade details are equal to current market values of said one or more trade details.

29. The method of claim 28, further comprising advising the user if the adjusted values of the one or more trade details differ from current market values of said one or more trade details.

30. The method of claim 29, wherein the one or more trade details comprises at least one of a price and a quantity of at least one product available for trade.

31. The method of claim 30, wherein the at least one product available for trade comprises at least one from the group consisting of commodities, natural resources, financial instruments, and derivative products.

32. The method of claim 20, wherein the user is at least one of an individual trader, a trading company, and a broker.

33. A trading terminal comprising:

an interface software program that when run generates a user interface display, enables a user to perform trading functions and ancillary functions provided by at least one exchange server, automatically generates a transaction window for use in adjusting one or more trade details and initiating one or more trading functions, displays the transaction window at the moment an on-screen cursor is positioned over one or more trade details, and enables a user to adjust one or more of the trade details prior to executing a trading function.

34. The trading terminal of claim 33, further comprising a user input device which is operable for adjusting trade details and initiating the trading functions and ancillary functions.

35. The trading terminal of claim 34, further comprising a display for displaying the user interface to the user.

36. The trading terminal of claim 35, wherein the user interface comprises one or more display tabs for displaying pre-selected electronic trading data, said display tabs comprising one or more of an order tab for displaying order data to which a user has access, a deal tab for displaying trade data to which a user has access, and one or more portfolio tabs for displaying information relating to one or more trading markets which are bundled together into one or more portfolios.

37. The trading terminal of claim 36, wherein the user interface further comprises a markets window for displaying one or more commodities contracts being offered for sale and being bid on for purchase, together with one or more trade details associated with the one or more commodities contracts.

38. The trading terminal of claim 37, wherein the user interface further comprises a trade ticker window for displaying a continuous stream of quotes for one or more different commodities markets.

39. The trading terminal of claim 38, wherein the interface software program is configured to display the transaction window when a user, via the user input device, places the on-screen cursor over one or more trade details.

40. The trading terminal of claim 39, wherein the user input device is configured to adjust the one or more trade details in response to the user's manipulation of said user input device.

41. The trading terminal of claim 40, wherein the user input device comprises a roller mechanism, the roller mechanism being enabling the user to adjust the one or more trade details by rolling the roller mechanism.

42. The trading terminal of claim 41, wherein the trading functions comprise one or more selected from the group consisting of initiating new orders, initiating kill orders, hitting existing orders, and lifting existing orders.

43. The trading terminal of claim 42, wherein the ancillary functions comprise one or more functions selected from the group consisting of receiving product orders, providing current trade detail information relating to the product orders, changing product trade details, providing real-time market data for one or more markets, and providing trade execution confirmation information.

44. The, trading terminal claim 43, wherein the one or more trade details comprises at least one of a price and a quantity of at least one product available for trade.

45. The trading terminal of claim 44, wherein the at least one product available for trade comprises one or more selected from the group consisting of commodities, natural resources, financial instruments, and derivative products.

46. The trading terminal of claim 33, wherein the user interface is operable for use by at least one of an individual trader, a trading company, and a broker.

* * * * *